US009286683B1

(12) United States Patent
Ramos

(10) Patent No.: US 9,286,683 B1
(45) Date of Patent: Mar. 15, 2016

(54) TEXT DETECTION NEAR DISPLAY SCREEN EDGE

(71) Applicant: Amazon Technologies, Inc., Reno, NV (US)

(72) Inventor: David Paul Ramos, Cambridge, MA (US)

(73) Assignee: Amazon Technologies, Inc., Reno, NV (US)

( * ) Notice: Subject to any disclaimer, the term of this patent is extended or adjusted under 35 U.S.C. 154(b) by 262 days.

(21) Appl. No.: 13/865,114

(22) Filed: Apr. 17, 2013

(51) Int. Cl.
G06T 7/00 (2006.01)

(52) U.S. Cl.
CPC ..................................... *G06T 7/004* (2013.01)

(58) Field of Classification Search
CPC .... G06K 9/72; G06K 9/3283; G06K 9/00456
USPC ....................................... 348/222.1; 382/282
See application file for complete search history.

(56) References Cited

U.S. PATENT DOCUMENTS

| | | | |
|---|---|---|---|
| 6,252,984 B1 * | 6/2001 | Haneda et al. ................. 382/181 |
| 2003/0044068 A1 * | 3/2003 | Kagehiro et al. ............. 382/182 |
| 2003/0233514 A1 * | 12/2003 | Honig ............... G06F 17/30982 711/108 |
| 2005/0193018 A1 * | 9/2005 | Rosdahl ...................... 707/104.1 |
| 2006/0013444 A1 * | 1/2006 | Kurzweil et al. ............. 382/114 |
| 2006/0041828 A1 * | 2/2006 | King et al. .................... 715/500 |
| 2006/0079991 A1 * | 4/2006 | Pintsov ................. G06Q 10/083 700/221 |
| 2009/0103808 A1 * | 4/2009 | Dey ...................... G06K 9/3283 382/177 |
| 2009/0175493 A1 * | 7/2009 | Yokoi ................. G06K 9/00463 382/100 |
| 2011/0170788 A1 * | 7/2011 | Nepomniachtchi ........... 382/229 |
| 2012/0029920 A1 * | 2/2012 | Kurzweil et al. ............. 704/260 |
| 2013/0294654 A1 * | 11/2013 | Burry ....................... G06K 9/34 382/105 |
| 2014/0023278 A1 * | 1/2014 | Krishna Kumar et al. .... 382/192 |
| 2014/0111542 A1 * | 4/2014 | Wan .............................. 345/633 |
| 2014/0161365 A1 * | 6/2014 | Acharya .............. G06K 9/3283 382/229 |
| 2014/0163983 A1 * | 6/2014 | Kim ........................ G01L 15/26 704/235 |
| 2014/0193136 A1 * | 7/2014 | Nishizawa ........... G11B 27/034 386/248 |
| 2015/0071546 A1 * | 3/2015 | Fujieda .................. G06K 9/342 382/190 |

* cited by examiner

*Primary Examiner* — Roberto Velez
*Assistant Examiner* — Cynthia Segura
(74) *Attorney, Agent, or Firm* — Novak Druce Connolly Bove + Quigg LLP

(57) ABSTRACT

Approaches to enable a computing device, such as a phone or tablet computer, to detect when text contained in an image captured by the camera is sufficiently close to the edge of the screen and to infer whether the text is likely to be cut off by the edge of the screen such that the text contained in the image is incomplete. If the incomplete text corresponds to actionable text associated with a function that can be invoked on the computing device, the computing device may wait until the remaining portion of the actionable text is captured by the camera and made available for processing before invoking the corresponding function on the computing device.

20 Claims, 8 Drawing Sheets

TEXT DETECTION NEAR DISPLAY SCREEN EDGE

BACKGROUND

Recent years have seen drastic increases in the use of portable computing devices, such as smart phones and tablet computers. Today's consumers are utilizing such devices for a wide variety of different purposes, such as to access and search the Internet, purchase products and services, capture and/or send digital images, compose electronic mail (email) messages, make telephone calls and the like. One particular area of some attention has been the ability to process image data captured by digital cameras often embedded in such devices in order to perform various actions based on the information in the image. For example, if the image contains an object that can be recognized as a product, the computing device may invoke an application to purchase the product from an electronic commerce (e-commerce) provider. Similarly, if the image contains an object recognized as a place of business (e.g., restaurant, bar, etc.) or an address, the computing device may invoke a map application to display directions to the user. Many other examples of such image processing are also possible.

In this image processing context, problems may arise when the camera of the computing device is aimed in such a way as to capture only a portion of the object, where the remaining portion of the object is outside of the field of view of the camera. In particular, cutting off portions of certain text in such a manner may cause the computing device to perform actions that are erroneous or do not conform to the expectations of the user.

BRIEF DESCRIPTION OF THE DRAWINGS

Various embodiments in accordance with the present disclosure will be described with reference to the drawings, in which.

DETAILED DESCRIPTION

Figure 1:
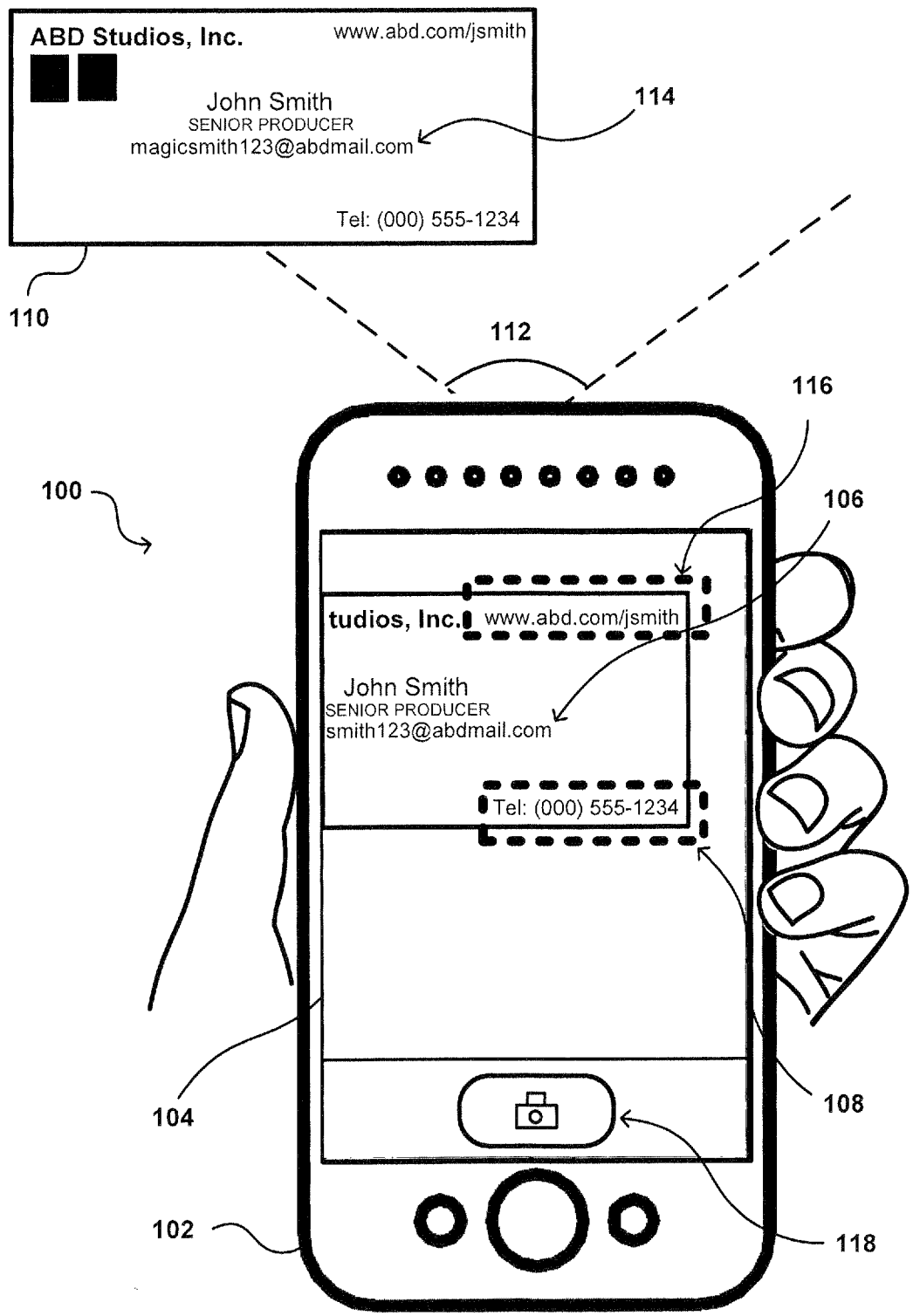
FIG. 1 illustrates an example of a computing device being used to detect whether actionable text is likely to be incomplete, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for processing image data captured using one or more cameras. In particular, various approaches discussed herein enable a computing device, such as a phone or tablet computer, to detect when text contained in an image captured by the camera is sufficiently close to the edge of the screen (e.g., within a threshold distance of the edge/border of the image captured by the camera) and to infer whether the text is likely to be cut off by the edge of the screen such that the text contained in the image is incomplete. In particular, if the incomplete text corresponds to actionable text the computing device may wait until the remaining portion of the actionable text is captured by the camera and made available for processing before invoking the corresponding function on the computing device. As used herein, the term "actionable text" can include any textual content recognized in the image that can be used to invoke an application or a function on the computing device. Some examples of actionable text include telephone numbers which may be used to invoke the phone dialer application on the device, web addresses that may be provided to the browser application, email addresses that may be used to invoke the email application to create a new email message and the like. Once the computing device recognizes actionable text in the image, it may determine whether the text is complete or incomplete based on the distance between the text and the edge of the image. For example, if the actionable text is an electronic mail (email) address that is located within a threshold distance of the left edge of the image (from the user's perspective), then the computing device may infer that the email address is likely to be incomplete and wait until the device is able to confirm that the entirety of the email address has been captured before invoking the email application. Similarly, if the actionable text is a uniform resource locator (URL) of a web page that is located within a threshold distance of the right edge of the image, the computing device may infer that the actionable text is incomplete and wait until the entirety of the text can be captured. In at least some embodiments, if the device infers that the actionable text is likely to be incomplete, the device may display one or more visual hits (e.g., direction arrows, instructions, or other graphical elements) to the user, instructing the user to move the device such that the remaining portion of the actionable text is captured within the field of view of the camera.

In some embodiments, the image processing and edge determination described herein may be carried out by a client computing device communicating with a remote server that includes an optical character recognition (OCR) engine and other image processing components. When the client computing device (e.g., mobile phone) captures an image (or a sequence of images), the computing device may process the image to detect one or more maximally stable extremal regions (MSER) which can be used to determine whether one or more glyphs are likely contained in any portion of the image. If one or more glyphs are detected in the image, the client device may further determine whether the glyphs are within a threshold distance from the edge of the image (e.g., and thus the display screen) or are being cut off by the edge of image. The client device may then transmit the image data to a remote server for processing by the OCR engine and for additional semantic boosting to be performed. Along with the image data, edge distance information can be provided to the server, such as information indicating whether the glyphs are within the threshold distance to the edge, or cut off by the edge. Semantic boosting is generally used to infer the meaning of text and/or the user's intent. In particular, semantic boosting can be used to enhance OCR accuracy. One example of semantic boosting is when the server compares the determined URL in the image to a list of known URLs. If one of the characters in the URL was incorrectly identified by the OCR engine, semantic boosting may provide the correct URL that should have been identified. Another example of semantic boosting may be area code validation, where the server may compare the area code of the user's location with the identified area code and determine whether the area code is valid for the user's location. Another example of semantic boosting is business name validation, where the server compares the text that has been identified as a potential business name to a list of known business names. This allows the server to correct any incorrectly identified characters in the name by the OCR engine. Other examples of semantic boosting are also possible, such as address (e.g., street name) validation, language model validation, and the like.

The server may include an OCR engine configured to process the image data received from the client device in order to recognize at least a portion of text in the image data. In addition, the server may perform additional semantic boosting of the text in order to compensate for any errors in the OCR processing, such as by comparing the recognized text to a known data set (e.g., list of possible URLs, vocabulary words, etc.).

In various embodiments, the remote server determines or infers whether the recognized text is likely to be incomplete based at least in part on the edge distance information received from the client device. For example, if a recognized character is within a certain threshold number of pixels away from the edge of the image, the server may determine that the text is likely to be incomplete. It should be noted that throughout this disclosure the terms "edge of the image" and "edge of the screen" are often used interchangeably and are intended to mean the outermost limit or border of the area captured in the image by the camera of the computing device. The threshold distance to the edge of the image may be selected based on the size of the other characters in the text, the font of the text, the space between each letter in the text, the height of the text, or the like. Similarly, if the server determines that a glyph is partially cut off by the edge, the server may infer that the text is likely to be incomplete. Once the server has completed processing the image data, the server may return the corrected text to the client device. Along with the resulting text, the server may provide an indication to the client, of whether the text is likely to be complete or incomplete. Alternatively, the inference of whether the text is likely to be incomplete may be made on the client computing device.

Once the client device receives the corrected text from the server, the client device may control the display of various graphical elements on the display screen according to the recognized corrected text. For example, if the client device determines that the text is completed actionable text, the device may display a graphical element that can be activated by the user to invoke an application associated with the actionable text. Similarly, if the client device determines that the actionable text is incomplete, the device may display instructions to the user, to move the device in a particular direction to enable the camera to capture the remaining portions of the actionable text. Alternatively, the device may simply hold off on displaying the graphical element to activate the application until the remaining portion of the text has been captured.

It should be noted that although some examples described throughout this specification describe some ways to split up the processing between the computing device and a remote server, this is not intended to be limiting to all embodiments described herein. In other embodiments, the processing to determine whether the actionable text is incomplete and other operations may entirely be performed by the client computing device, or entirely be performed by the remote server, or may be split in other ways, as will be evident to one of ordinary skill in the art.

FIG. 1 illustrates an example 100 of a computing device being used to detect whether actionable text is likely to be incomplete, in accordance with various embodiments. The client computing device 102 is shown to be a mobile phone, however the computing device may be any device including a processor and a display, including but not limited to tablet computers, laptops, personal digital assistants (PDAs), personal computers (PCs), or the like. The computing device 102 may include one or more digital cameras configured to capture an image or a sequence of images. In at least some embodiments, the computing device 102 may operate in a live camera view mode, where the sequence of images being captured by the camera is continuously being displayed on the display screen 104 of the computing device 102. In this live camera view mode, the user of the computing device 102 may activate a shutter element 118 (e.g., button, touch screen element, etc.) to cause the camera to capture (i.e., snap) the image currently being displayed on the display screen 104 and persist that image into non-volatile memory, such as flash memory, solid state drive (SSD) or the like.

Additionally, while operating in the live camera view mode, the computing device 102 may display various information and graphical elements overlaid on top of the objects in the image currently being displayed, such as to indicate to the user that a particular portion of the image may be actionable (i.e., be associated with a function or application that may be invoked on the computing device 104). For example, the computing device 102 may display graphical elements (e.g., boxes, oval shapes, etc.) around actionable text detected in the image stream, such as box 116 to indicate that the object in the image corresponds to a uniform resource locator (URL) of a web page, or box 108 to indicate that the object in the image corresponds to a phone number. The user is enabled to activate the graphical elements (108, 116), such as by touching the location of the touch screen display 104 where the graphical elements (108, 116) are being displayed. The activation of the graphical elements may cause the computing device 102 to invoke an application or a function associated with the object being displayed on the screen. For example, as shown in the illustration, if the user activates graphical element 116, the computing device may invoke the browser application to open the web page corresponding to the URL "www.abd.com/jsmith" being captured in the image. Similarly, if the user activates graphical element 108, the computing device 102 may invoke a phone dialer application to enable the user to dial the phone number "(000) 555-1234" being displayed on the screen 104.

In the illustrated embodiment, camera of the computing device 102 is shown as being aimed at a business card 110, such that a portion of the business card 110 is within the field of view 112 of the camera. The business card 110 contains various text, such as the name of a business and person, an email address 114, a telephone number and a URL for a web page. However, in this example, because only a portion of the business card is within the field of view 112 of the camera, the email address is effectively cut off by the edge of the screen (i.e., the boundary edge of the image captured by the camera). As a result, the email address 106 being displayed on the screen is incomplete because some of the username portion of the email address is outside of the field of the view 112 of the camera. It is worth noting that particularly for email addresses, it can be quite possible to cut off a portion of the username in the email address (i.e., any characters before the '@' symbol) and still end up with a valid-looking email address when parsed by the computing device using conventional techniques. Because the username portion is often comprised of arbitrary characters, it can be difficult to determine when the username is complete and when it is not. For example, as shown in the illustration, the portion of the email address 106 captured within the camera's field of view 112 shows the email address "smith123@abdmail.com" 106 which would appear to be a valid email address when semantically parsed by the device even though it is missing several characters. This incompleteness may cause the computing device to perform functions that are not what the user intended and may otherwise degrade the user experience.

In order to resolve such potential errors, the computing device 102 may implement one or more components (e.g., hardware, software or combination thereof) that determine when the recognized characters are within a threshold distance from the edge of the display screen (or the boundary edge of the image captured by the camera). In particular, when it is detected that the characters of the email address 106 are within a threshold number of pixels from the edge of the screen, the computing device may refrain from displaying any graphical elements based on the inference that the actionable text is incomplete. Alternatively, the computing device 102 may display visual hints or instructions for the user to move the computing device 102 in a particular direction such that the remaining portion of the actionable text is captured within the field of view 112 of the camera.

In at least some embodiments, the computing device 102 (or remote server) may further consider the content of the actionable text when attempting to infer whether the actionable text is likely to be incomplete. For example, if the actionable text is determined to be an email address that ends with certain predetermined characters, such as '.com' near the right edge of the screen (from the user's perspective), the computing device may infer that the actionable text is complete even if the last character is within the threshold distance of the screen edge. However, if the email address is determined to be sufficiently close to the left edge of the screen (from the user's perspective), then the computing device may infer that the email address is likely incomplete. Similarly, in these or other embodiments, if one or more characters of the actionable text are cut off by the edge of the screen but can still be inferred to a sufficient degree of certainty, the computing device may still display the graphical elements to invoke the actionable text.

Although the illustration in FIG. 1 shows an example of detecting an incomplete email address, it is noted that many other examples of incomplete actionable text may be inferred within the scope of the various embodiments described herein. For example, actionable text may include, but is not limited to, web site URLs, telephone numbers, addresses, ZIP codes, barcodes and UPC codes, license plate numbers and the like. In some embodiments, the upper or lower boundary edges may also be utilized to detect incomplete actionable text. For example, certain languages include writing systems where characters are written in a vertical sequence as opposed to Latin-based languages where the characters are written in a horizontal sequence. For these languages, the top edge of the image or the bottom edge of the image may be more useful to determine whether the actionable text is incomplete. Similarly, if a barcode is detected in the image and one or more MSERs are detected just underneath the barcode, the computing device may infer that the MSERs correspond to numbers located underneath the barcode. The device may then instruct the user to move the device down (from the user's perspective) if the numbers are needed to perform the action on the device. In addition to actionable text, the various embodiments described herein may also be utilized with non-actionable text, such as in order to determine when the entirety of the textual content has been captured within the camera's field of view.

Figure 2:
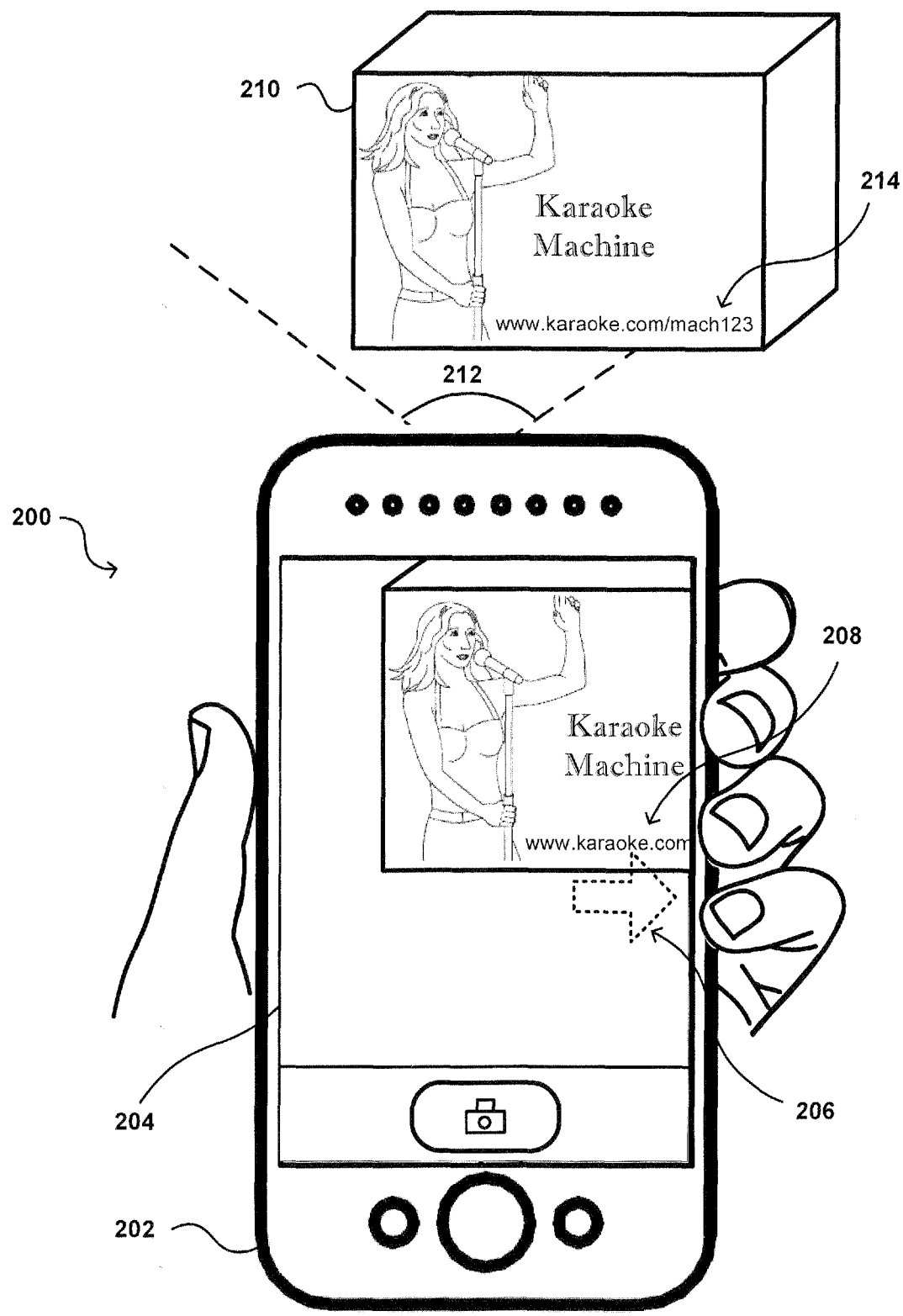
FIG. 2 illustrates another example of a computing device being used to detect whether actionable text is likely to be incomplete, in accordance with various embodiments.

FIG. 2 illustrates another example 200 of a computing device being used to detect whether actionable text is likely to be incomplete, in accordance with various embodiments. In this example, the computing device 202 is a mobile phone being aimed at a product box 210 (i.e., containing a karaoke machine) that includes a URL 214 of a web site printed on the product's packaging. The computing device 202 is aimed in such a way that only a portion of the product 210 is being captured within the field of view 212 of the camera. In particular, only a portion of the URL 208 is being captured by the camera and displayed to the user on the display screen 204.

As previously described, based on processing the image and detecting that one or more characters are within a threshold distance from the screen edge, the computing device may determine that the URL 208 is likely to be incomplete. In response to determining that the text is incomplete, the computing device 202 displays one or more visual hints to the user on the display screen 204. In this particular example, the visual hint is an arrow 206 displayed on the screen, pointing in the direction to which the device should be moved in order to enable the camera to capture the remaining portion of the actionable text (i.e., URL of the web page). However, the visual hints may also be presented in other forms, such as text-based (and/or audible) instructions presented to the user, instructing the user to move the computing device 202. As another example, the visual hints may comprise one or more moving graphical objects on the display screen where the moving objects surround the actionable text and/or move in a particular direction to instruct the user move the computing device in that direction. Many other examples of visual hints and/or instructions are possible within the scope of the various embodiments described herein.

Notably, in the example illustrated in FIG. 2, the URL 208 is cut off by the right side of the screen edge from the perspective of the user. In the context of URLs, it is quite possible to cut off the beginning of a URL (any characters before the top-level domain), or the path of a URL (any characters after the first '/' symbol) and end up with a seemingly valid URL from the perspective of semantically parsing the URL. While semantic boosting techniques can compare a determined URL to a list of well-known URLs, this process is more difficult and error prone when it comes to the more specific paths of URLs, such as the characters following the '/' symbol because the specific path may not be easily compared to a known data set. In various embodiments, the techniques for edge detection described herein can enable the computing device and/or server to determine when such paths/beginnings of URLs are incomplete even when conventional semantic boosting algorithms fail to detect those incompletions.

Figure 3:
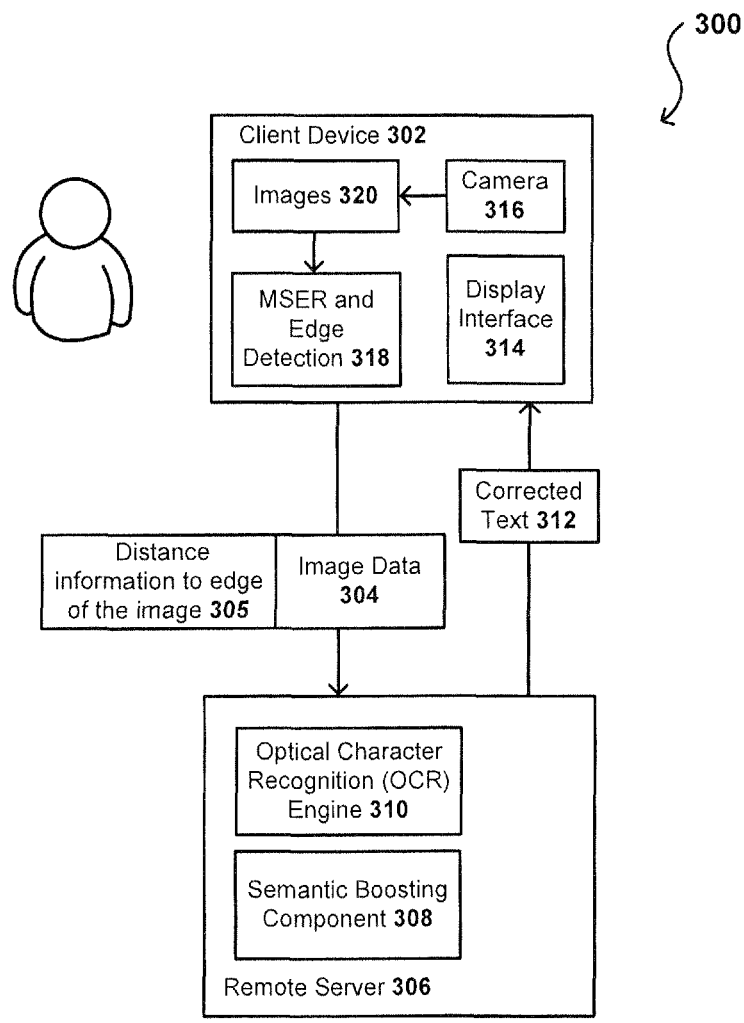
FIG. 3 illustrates an example of a client computing device in communication with a remote server to process the image data, in accordance with various embodiments.

FIG. 3 illustrates an example 300 of a client computing device in communication with a remote server to process the image data, in accordance with various embodiments. As shown in the illustration, the client computing device 302 may communicate with a remote server 306 to determine when the actionable text is incomplete using the edge detection techniques described herein.

In the illustrated embodiment, the computing device 302 may use at least one camera 316 to capture one or more images 320. For example, the capturing of the images may be performed while the device 302 is in live camera view mode, such as by continuously capturing a stream (e.g., sequence) of images. Once an image has been captured by the camera, the computing device may perform MSER and edge detection 318. MSER is a region detection algorithm that can be used to look for contrast in different regions of the image and check those regions against a glyph identifier to determine whether the image contains one or more glyphs that may correspond to actionable text. MSER is well known in the art, however, any other algorithms for region and/or glyph detection may be implemented within the scope of the present disclosure. A glyph can be any shape, design, or representation that may correspond to a text character. In some embodiments, at the time of detecting the glyph, the computing device may not be able to determine with sufficient certainty which specific textual character the glyph represents until the image data is processed by the OCR engine, as discussed below. In addition to detecting the areas of the image that are likely to contain glyphs, the computing device 302 may also determine whether the glyphs are arranged in a horizontal line across the display screen. If the glyphs are arranged in a horizontal line, the computing device 302 may infer that the glyphs are more likely to correspond to text and in particular to actionable text.

In addition to detecting one or more glyphs, the computing device may determine edge distance information. For example, the computing device 302 may determine whether one or more glyphs are within a threshold distance to the edge of the display screen (i.e. boundary of the image) or whether at least a portion of one of the glyphs is being cut off by the edge of the image. Once the edge distance information is determined, the computing device 302 may transmit the image data 304 containing the glyphs to the remote server 306 for processing. For example, in some embodiments, the client computing device 302 transmits the entire image that was captured by the camera to the remote server 306. In other embodiments, the client computing device 302 transmits only the portions of the image that have been determined to include the glyphs detected in the image. In various embodiments, the transmitted data may include edge distance information 305, such as an indication of which glyphs are located within a threshold distance to the edge of the display screen. For example, if the client computing device 302 is only transmitting the portions of the image containing the glyphs to the server 306, the information transmitted to the server 306 may also indicate the distance of the glyph to the edge of the image. Alternatively, if the client computing device 302 is transmitting the entire image to the remote server 306, there may not need to be any edge distance information included in the transmission and the remote server may analyze the entire image received from the client computing device in order to determine the edge distance information on the server side.

In the illustrated embodiment, the remote server 306 receives the image data 304 and causes the image data to be processed by the optical character recognition (OCR) engine 310, as well as any additional semantic boosting component 308. Optical character recognition (OCR) systems are well known in the art and are frequently used for recognizing text characters in an image or in other mediums. In the illustrated embodiment, the OCR engine 310 is used to process the image data and recognize one or more text characters in the regions identified by the computing device. In addition to performing OCR, the server 306 may perform additional semantic boosting 308 of the text in order to compensate for any errors in the OCR processing, such as by comparing the recognized text to a known data set (e.g., list of possible URLs, vocabulary words, etc.). For example, if the OCR engine incorrectly identifies one of the glyphs, the additional semantic boosting may correct the error by comparing the entire portion of text to known words or other data.

In addition to performing OCR and semantic boosting, the server 306 may infer whether the text (e.g., actionable text) is likely to be complete or incomplete based on the edge distance information determined by the computing device (or determined by the server). For example, if the actionable text is an email address that is located within a threshold distance (e.g., pixels, millimeters, etc.) of the left edge of the screen from the user's perspective, then the server 306 may infer that the email address is likely to be incomplete. Similarly, if the actionable text is a uniform resource locator (URL) of a web page that is located within a threshold distance of the right edge of the screen, the server 306 may infer that the actionable text is incomplete.

Once the image processing has been performed, the server 306 may provide the corrected text 312 to the computing device 302. In addition to the corrected text, the server 306 may provide the user with the indication of whether the text is likely to be complete or incomplete. The computing device 302 may use the information received from the server 306 to control the display of various graphical elements on the display interface 314 (e.g., touch screen display). For example, if the text is inferred to be complete actionable text, the computing device may cause the interface 314 to display a graphical element in a location proximate to the location of the text in the image, where the graphical element may be activated (e.g., clicked) by the user to invoke an application or function on the computing device. If the text is inferred to be incomplete actionable text, the computing device may wait until the remaining portion of the actionable text is captured by the camera of the computing device. In addition, or in the alternative, the computing device 302 may cause the display interface 314 to display visual hints or instructions to the user to move the computing device, as previously described.

It should be noted that although the example illustrated in FIG. 3 separates the processing between the computing device 302 and the remote server 306 in a particular manner, this separation should be construed to limit all of the embodiments described herein. In various alternative embodiments, the processing may be separated in a different manner, or performed solely on the computing device or remote server without communication over the network.

Figure 4:
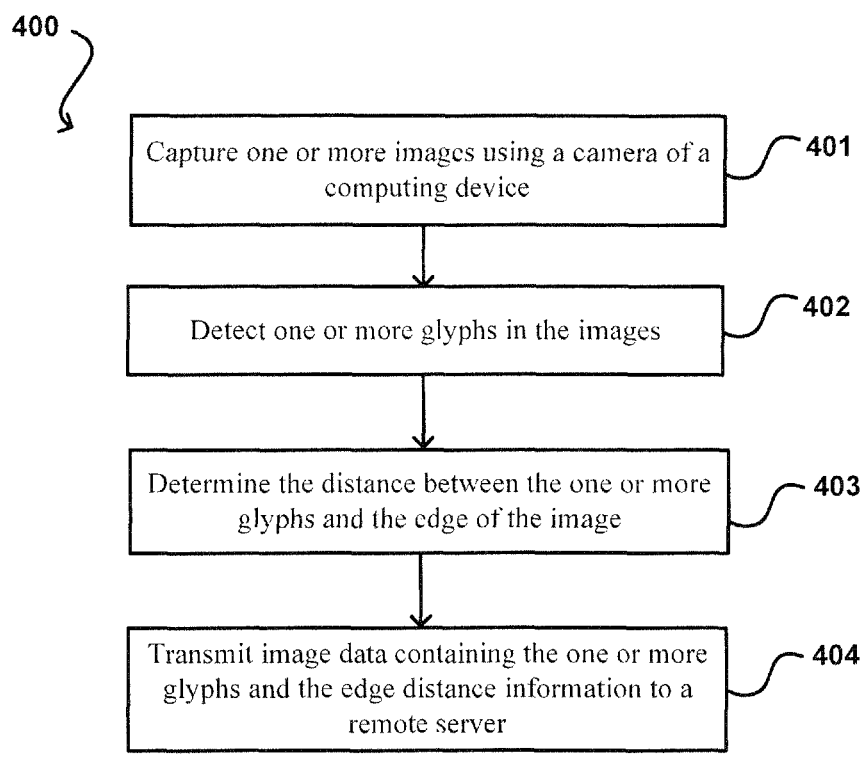
FIG. 4 illustrates an example of a process performed by a client computing device, in accordance with various embodiments.

FIG. 4 illustrates an example of a process 400 performed by a client computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the computing device captures one or more images using at least one camera embedded in the computing device. For example, the computing device may be a mobile phone or tablet computer, having a rear-facing digital camera configured to capture the one or more images. In some embodiments, the images are captured by the camera while the computing device is in a live camera view mode, where the camera is continuously capturing a stream of images and displaying the images on the display screen of the computing device.

In operation 402, the computing device detects one or more glyphs in the image. The glyph detection can be performed by applying MSER for region detection and analyzing the regions by a glyph identifier. Once one or more glyphs have been detected, the computing device may determine the distance between the one or more glyphs and the edge of the image (e.g. border of the captured image), as shown in operation 403. In some embodiments, the computing device may determine whether any of the glyphs are within a threshold distance of the edge of the display screen or are cut off by the edge of the display screen. In other embodiments, the threshold determination may be performed on the server after the server has received the distance information and the image data. As previously mentioned, the threshold distance may be selected according to the size of the font of the text, the distance between other characters in the text and the like.

In operation 404, the computing device may transmit the image data containing the one or more glyphs and the edge distance information to a remote server for processing. In at least some embodiments, the client computing device may binarize the image, such that all MSERs that have been selected by the computing device are colored black and the rest of the image is colored white. This produces black text on a white background. The transmission may then be performed using a wireless network, such as a cellular communications network.

Figure 5:
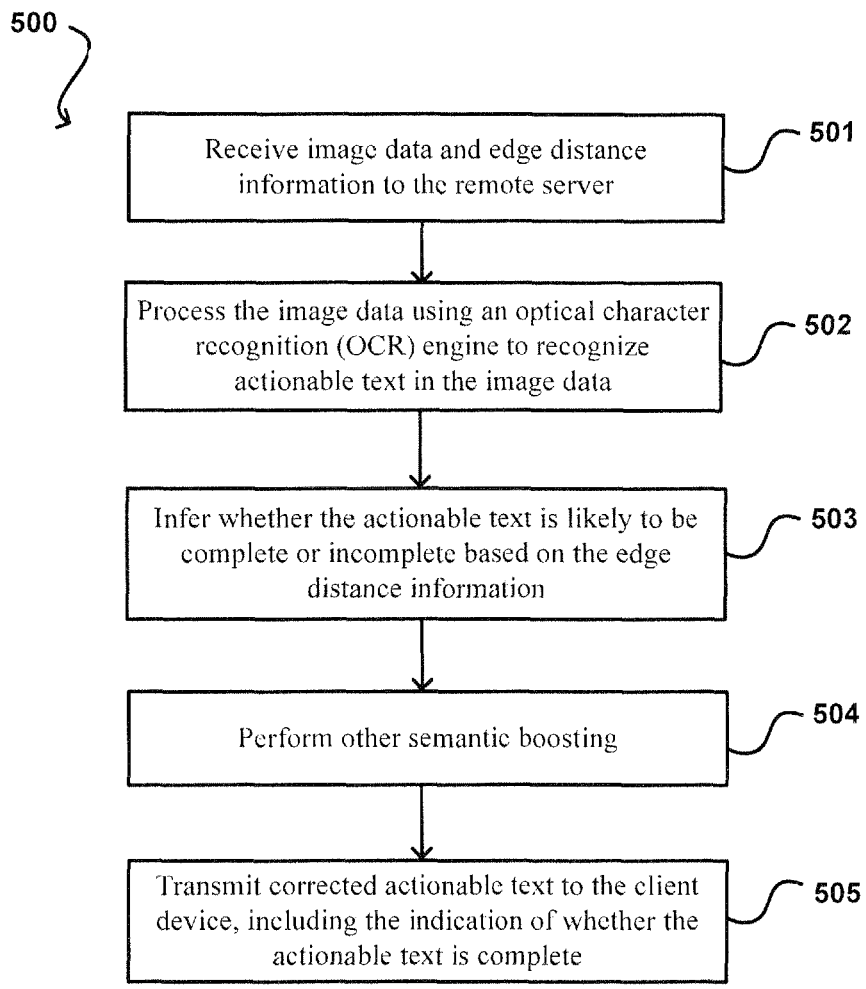
FIG. 5 illustrates an example of a process performed by a remote server upon receiving the image data from the computing device, in accordance with various embodiments.

FIG. 5 illustrates an example of a process 500 performed by a remote server upon receiving the image data from the computing device, in accordance with various embodiments. In operation 501, the remote server receives the image data, including the edge distance information from the client computing device. In operation 502, the server provides the image data to an OCR engine, as previously described. The OCR engine processes the image data and recognizes the textual characters contained therein. In at least some embodiments, the server may identify the recognized text as actionable text. In other embodiments, the classification of text as being actionable is performed by the client computing device.

In operation 503, the server infers whether the text is complete or incomplete based at least in part on the edge information provided by the computing device along with the image data. For example, the server may analyze the text and determine that the text corresponds to an email address and also determines that the email address is within a threshold distance to the left side of the display screen. Based on this information, the server may infer that the text is likely to be incomplete. In operation 504, the server may perform additional semantic boosting, such as by analyzing the text against a known data set to correct any errors that may have been introduced during the OCR process.

In operation 505, the remote server transmits the corrected actionable text to the client device, including the indication of whether the actionable text is complete or incomplete, as determined by the server. In other embodiments, the determinations of whether the text is actionable or incomplete may be performed on the client device, as previously described.

Figure 6:
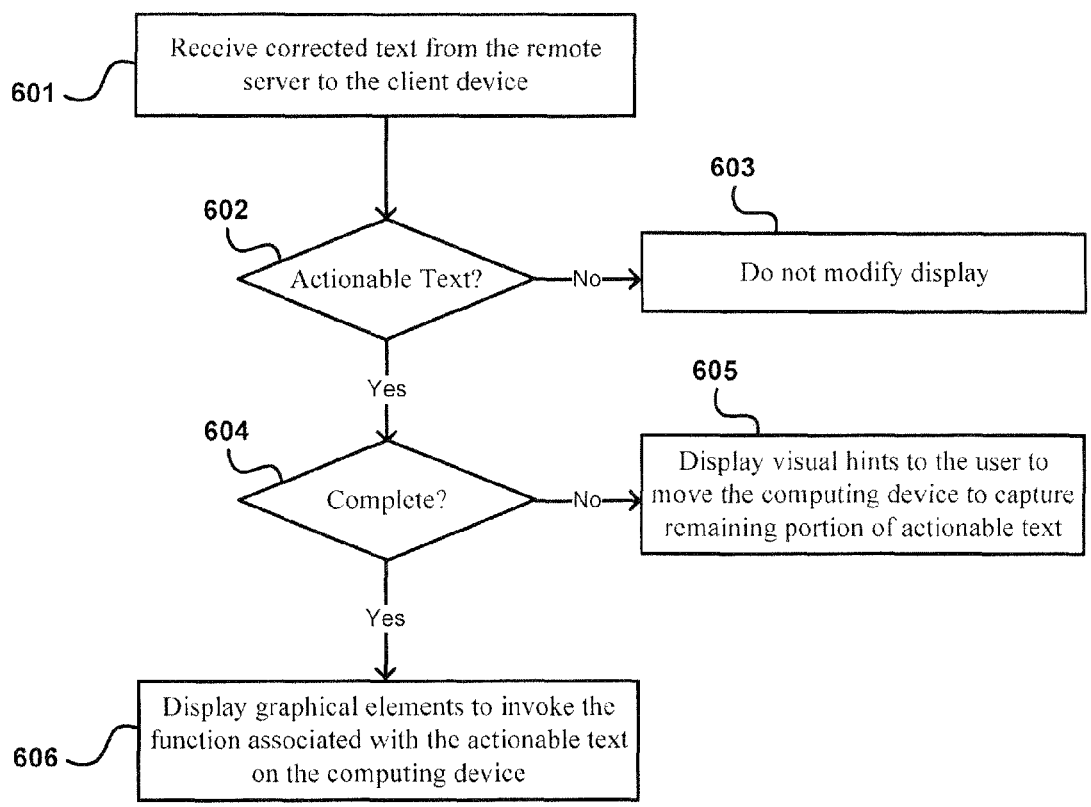
FIG. 6 illustrates an example of a process performed by the client computing device upon receiving the corrected text from the remote server, in accordance with various embodiments.

FIG. 6 illustrates an example of a process 600 performed by the client computing device upon receiving the corrected text from the remote server, in accordance with various embodiments. In operation 601, the client computing device receives the corrected text from the remote server. In operation 602, the computing device determines whether the text is actionable text. In some embodiments, the determination of whether the text is actionable may be based on the indication received by the server, indicating that the text is actionable. In other embodiments, the computing device itself may carry out the processing to determine whether the text received from the server is actionable text, i.e., whether the text corresponds to a particular function or application that can be invoked on the computing device. If, the text is not actionable text, the computing device may not modify the display screen to display any additional graphical elements, as shown in operation 603.

If the text is determined to be actionable, the computing device may determine whether the text is complete or incomplete, as shown in operation 604. As previously mentioned, the determination may be based on the communication received from the remote server, indicating whether the text is likely to be complete or incomplete. In other embodiments, the computing device may itself carry out the processes for determining whether the actionable text is likely to be complete.

If the text is likely to be complete actionable text, the computing device can display graphical elements that enable the user to invoke the function associated with the actionable text on the computing device, as shown in operation 606. For example, the computing device may display an box around the actionable text that may be selected by the user to invoke the function associated with the actionable text. If the actionable text is determined to be incomplete, the computing device may display visual hints to the user to move the computing device to capture remaining portion of actionable text, as shown in operation 605. Alternatively, the computing device may not display any hints and simply suspend the display of any graphical elements until the entirety of the actionable text may be captured.

Figure 7:
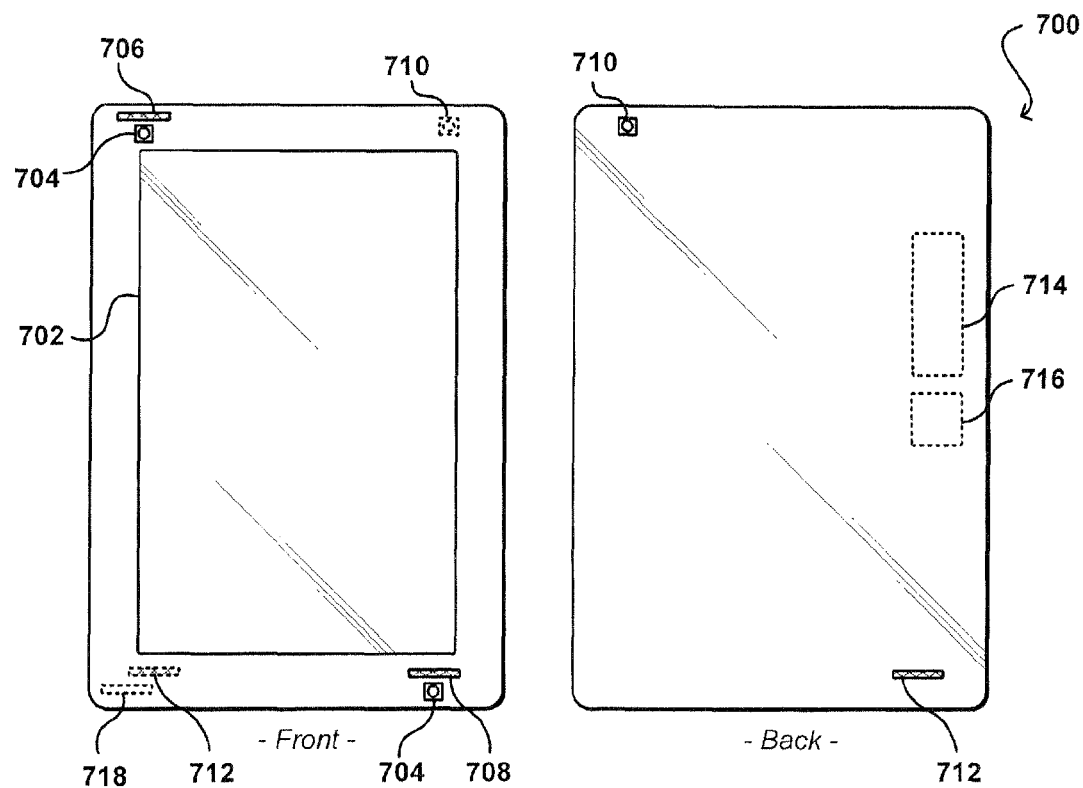
FIG. 7 illustrates front and back views of an example portable computing device that can be used in accordance with various embodiments.

FIG. 7 illustrates front and back views of an example client computing device 600 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 700 has a display screen 702 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 710 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 704 on the "front" of the device and one image capture element 710 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 706 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 700 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 714, such as may include at least one wired or wireless component operable to communicate with one or more portable computing devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
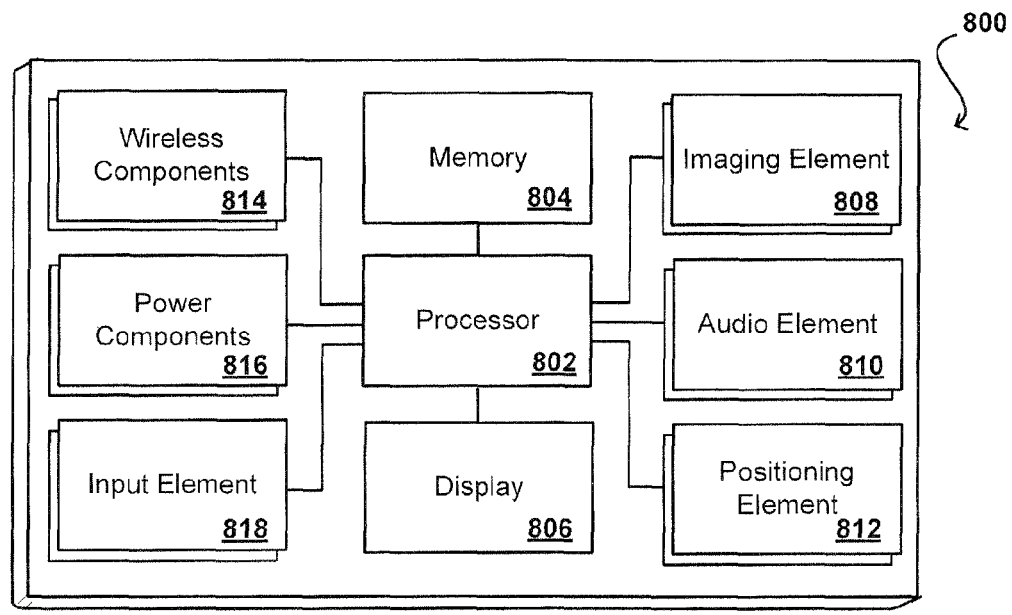
FIG. 8 illustrates an example set of basic components of a portable computing device, such as the device described with respect to FIG. 7.

In order to provide functionality such as that described with respect to FIG. 7, FIG. 8 illustrates an example set of basic components of a portable computing device 800, such as the device 700 described with respect to FIG. 7. In this example, the device includes at least one processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 810, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 812 that provides information such as a position, direction, motion, or orientation of the device. This positioning element 812 can include, for example, accelerometers, inertial sensors, electronic gyroscopes, electronic compasses, and GPS elements.

The device can include at least one additional input device 818 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 814 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 816 known in the art for providing power to a portable computing device, which can include capacitive charging elements for use with a power pad or similar device as discussed elsewhere herein. The example device also can include at least one touch and/or pressure sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 9:
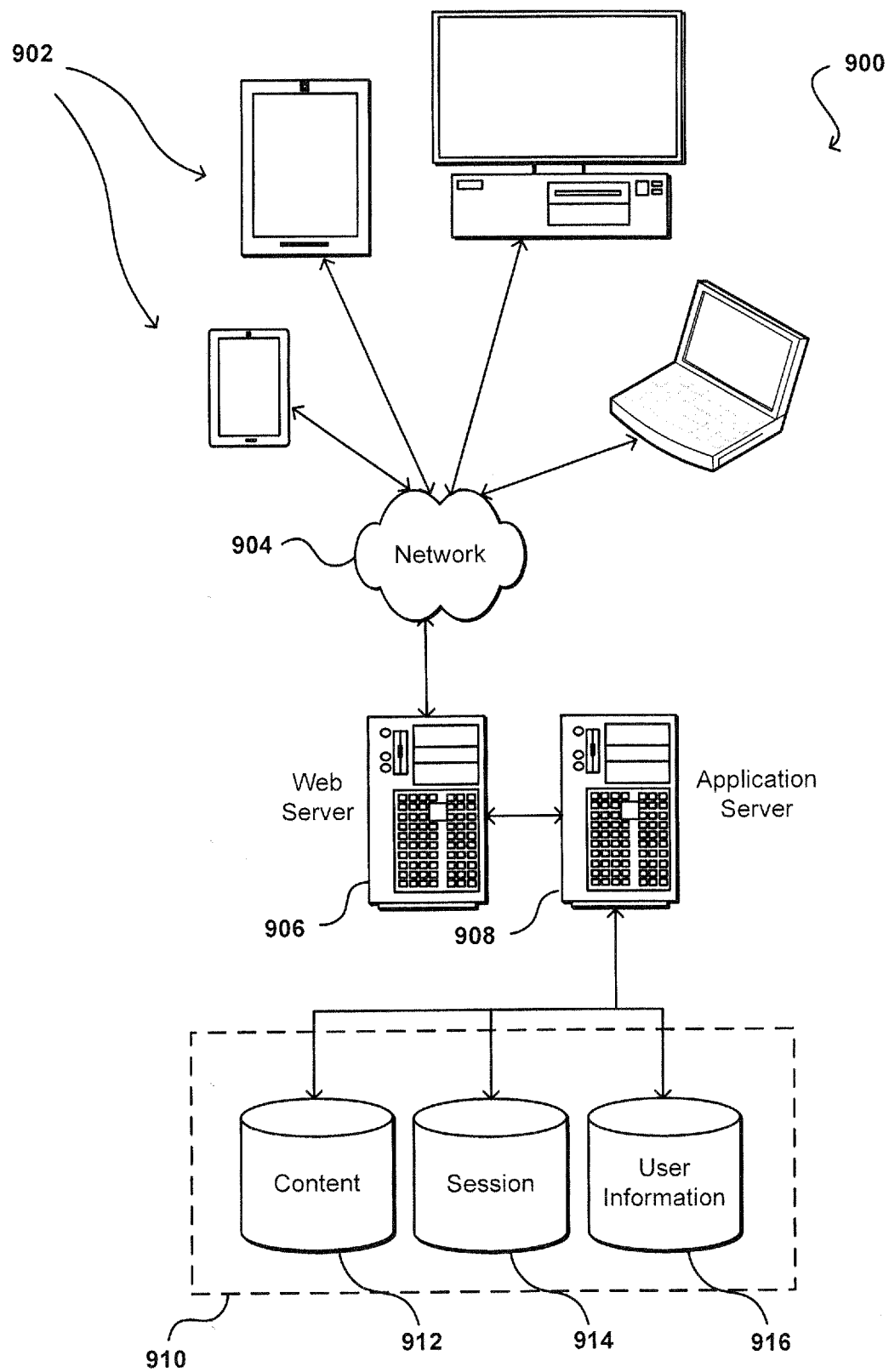
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, hand-held messaging devices, laptop computers, set-top boxes, personal data assistants, electronic book readers and the like.

The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a camera configured to capture an image;
    a display screen configured to display the image captured by the camera;
    at least one processor; and
    memory including instructions that, when executed by the at least one processor, cause the computing device to:
        detect one or more glyphs in the image;
        determine a distance between a first glyph of the one or more glyphs and an edge of the image;
        transmit the distance and image data containing the one or more glyphs to a server for processing by an optical character recognition (OCR) engine, wherein the server is configured to: analyze the image data, determine actionable text corresponding to the one or more glyphs is likely to be incomplete based at least in part on one or more characteristics of the actionable text and the distance, wherein the one or more characteristics of the actionable text include at least one of a character size of the actionable text, a font of the actionable text, a height of the actionable text, or a spacing between each character of the actionable text;
        receive a communication from the server indicating that the actionable text is likely to be incomplete; and
        display a graphical indication on the display screen indicating that the actionable text is likely to be incomplete.

2. The computing device of claim 1, wherein displaying the one or more graphical indications on the display screen further comprises:
    displaying, to a user, a visual hint to move the computing device in a direction.

3. The computing device of claim 1, wherein the one or more glyphs comprise at least a portion of: an electronic mail (email) address, a phone number, a uniform resource locator (URL), or a postal address.

4. A computer implemented method, comprising:
    under the control of one or more computer systems configured with executable instructions,
        receiving image data associated with an image captured by at least one camera of a computing device, the image data containing text;
        determining a distance between a character of the text and an edge of the image;
        determining that actionable text corresponding to the text of the image data may be incomplete based at least in part on one or more characteristics of the actionable text and the distance, wherein the one or more characteristics of the actionable text include at least one of a character size of the actionable text, a font of the actionable text, a height of the actionable text, or a spacing between each character of the actionable text; and
        providing an indication that the text of the image data may be incomplete.

5. The computer implemented method of claim 4, wherein determining that the actionable text corresponding to the text of the image data may be incomplete further comprises:
    determining that the text may correspond to an electronic mail address; and
    determining that the text is within a threshold distance of an edge of the image.

6. The computer implemented method of claim 4, wherein determining that the actionable text corresponding to the text of the image data may be incomplete further comprises:
    determining that the text may correspond to a uniform resource locator (URL) of a web page; and
    determining that the text is within a threshold distance of an edge of the image.

7. The computer implemented method of claim 4, further comprising:
  performing optical character recognition (OCR) on the image data to identify the text in the image; and
  transmitting the text to a computing device over a network.

8. The computer implemented method of claim 7, further comprising:
  performing semantic boosting on the text before transmitting the text to the computing device, the semantic boosting performed by comparing the text to a known data set.

9. The computer implemented method of claim 4, wherein determining the distance further comprises:
  determining a location of the character of the text and comparing the location of the character to the edge of the image.

10. The computer implemented method of claim 4, further comprising:
  determining that a glyph is cut off by the edge of the image.

11. The computer implemented method of claim 4, wherein determining that the actionable text corresponding to the text of the image data may be incomplete further comprises:
  determining the distance between the character of the text and the edge is less than a threshold distance, wherein the threshold distance is computed based on at least one of: a height or a width of one or more characters of the text.

12. The computer implemented method of claim 4, wherein determining that the actionable text corresponding to the text of the image data may be incomplete further comprises:
  determining that the distance between the character of the text and the edge is less than a threshold distance, wherein the threshold distance is computed based at least in part on character attributes of remaining characters in the text.

13. A computing device, comprising:
  a camera;
  at least one processor; and
  memory including instructions that, when executed by the at least one processor, cause the computing device to:
    capture an image using the camera, the image containing text;
    transmit image data corresponding to the image to a server, wherein the server is configured to determine when the text is likely to correspond to complete actionable text or incomplete actionable text based at least in part on one or more characteristics of the text, and a distance between the text and an edge of the image, wherein the one or more characteristics of the actionable text include at least one of a character size of the actionable text, a font of the actionable text, a height of the actionable text, or a spacing between each character of the actionable text;
    receive a communication from the server, the communication indicating whether the text in the image is likely to correspond to the complete actionable text or the incomplete actionable text;
    in response to the communication indicating that the text is likely to correspond to the complete actionable text, display a graphical component on a display screen, the graphical component actionable to invoke a function on the computing device; and
    in response to the communication indicating that the text is likely to correspond to the incomplete actionable text, display no graphical component on the display screen.

14. The computing device of claim 13, wherein the instructions, when executed by the at least one processor, cause the computing device to:
  detect one or more glyphs in the image; and
  wherein the image data comprises a portion of the image containing the one or more glyphs.

15. The computing device of claim 13, wherein the server is configured to:
  identify the text as likely corresponding to an electronic mail address; and
  determine that the text is within a threshold distance of an edge of the image.

16. The computing device of claim 13, wherein the memory further comprises instructions that, when executed by the at least one processor, cause the computing system to:
  apply a maximally stable extremal regions (MSER) algorithm to detect one or more glyphs in the image, the one or more glyphs corresponding to the at least a portion of text.

17. A non-transitory computer readable storage medium storing one or more sequences of instructions that, when executed by one or more processors, cause a computing system to:
  capture an image using a camera;
  detect a glyph in the image;
  determine a location of the glyph in the image;
  determine a distance between the glyph and an edge of the image based at least in part on the location of the glyph;
  determine that actionable text corresponding to the glyph is likely to be incomplete based at least in part on one or more characteristics of the actionable text and the distance wherein the one or more characteristics of the actionable text include at least one of a character size of the actionable text, a font of the actionable text, a height of the actionable text, or a spacing between each character of the actionable text; and
  display a visual indication based at least in part on a determination that the actionable text corresponding to the glyph is likely to be incomplete.

18. The non-transitory computer readable storage medium of claim 17, further comprising instructions that, when executed by the one or more processors, cause the computing system to:
  determine that the glyph is likely to correspond to a portion of an electronic mail address; and
  determine that the glyph is within a threshold distance of the edge of the image.

19. The non-transitory computer readable storage medium of claim 17, further comprising instructions that, when executed by the one or more processors, cause the computing system to:
  in response to determining that the actionable text corresponding to the glyph is likely to be incomplete, display one or more visual hints to move the computing device in a direction that enables the camera to capture additional text to complete the actionable text.

20. The non-transitory computer readable storage medium of claim 17, further comprising instructions that, when executed by the one or more processors, cause the computing system to:
  apply a maximally stable extremal regions (MSER) algorithm to detect the glyph in the image.

* * * * *